United States Patent [19]

Watson

[11] Patent Number: 5,038,136
[45] Date of Patent: Aug. 6, 1991

[54] TRAFFIC CONTROL DEVICE FOR SCHOOL BUSES

[76] Inventor: Douglas Watson, 17 Laurentide Road, Nepean, Ontario, K2H 6T6, Canada

[21] Appl. No.: 388,397

[22] Filed: Aug. 2, 1989

[30] Foreign Application Priority Data

Aug. 15, 1988 [CA] Canada .................................. 574776

[51] Int. Cl.⁵ .............................................. B60Q 1/26
[52] U.S. Cl. .................................. 340/480; 340/487; 340/433; 116/50
[58] Field of Search ............... 340/433, 484, 487, 480, 340/472; 40/491, 592; 116/50, 51, 28 R

[56] References Cited

U.S. PATENT DOCUMENTS

| | | | |
|---|---|---|---|
| 1,388,550 | 8/1921 | Cook | 340/484 X |
| 1,437,533 | 12/1922 | Major | 116/51 |
| 2,134,777 | 11/1938 | Clancy | 340/487 X |
| 2,170,370 | 8/1939 | Jacobus | 116/50 |
| 2,271,126 | 1/1942 | Marcus et al. | 116/50 |
| 2,603,700 | 7/1952 | Martin | 340/433 X |
| 2,654,877 | 10/1953 | Sparaco | 116/50 |
| 3,133,265 | 5/1964 | Fultz | 340/433 |
| 4,138,668 | 2/1979 | Latta, Jr. et al. | 340/433 |
| 4,766,413 | 8/1988 | Reavell | 340/433 |
| 4,825,192 | 4/1989 | Wells | 340/433 |

*Primary Examiner*—Joseph A. Orsino
*Assistant Examiner*—Brian R. Tumm
*Attorney, Agent, or Firm*—Pascal & Associates

[57] ABSTRACT

A traffic control device for use on school buses which locates the traffic control sign in the normal field of view of oncoming traffic, yet is robust, can be extended and retracted automatically and rapidly, and substantially does not suffer wind, acceleration or deceleration damage during movement of the school bus. The traffic control device is comprised of a traffic control display such as a stop sign, apparatus for supporting the display in a horizontal plane adjacent the vehicle, and apparatus for thrusting the display outwardly from the side of the vehicle while rotating the display through 90° to change the facing direction of the display to a plane visible to the traffic. The supporting apparatus is comprised of a beam, the display being fixed to the end of the beam. The rotating apparatus is comprised of the apparatus for thrusting the beam outwardly from the vehicle whereby the display is rotated through 90° while being moved from a position adjacent the vehicle to a position in the direct line of sight of drivers of oncoming traffic.

29 Claims, 10 Drawing Sheets

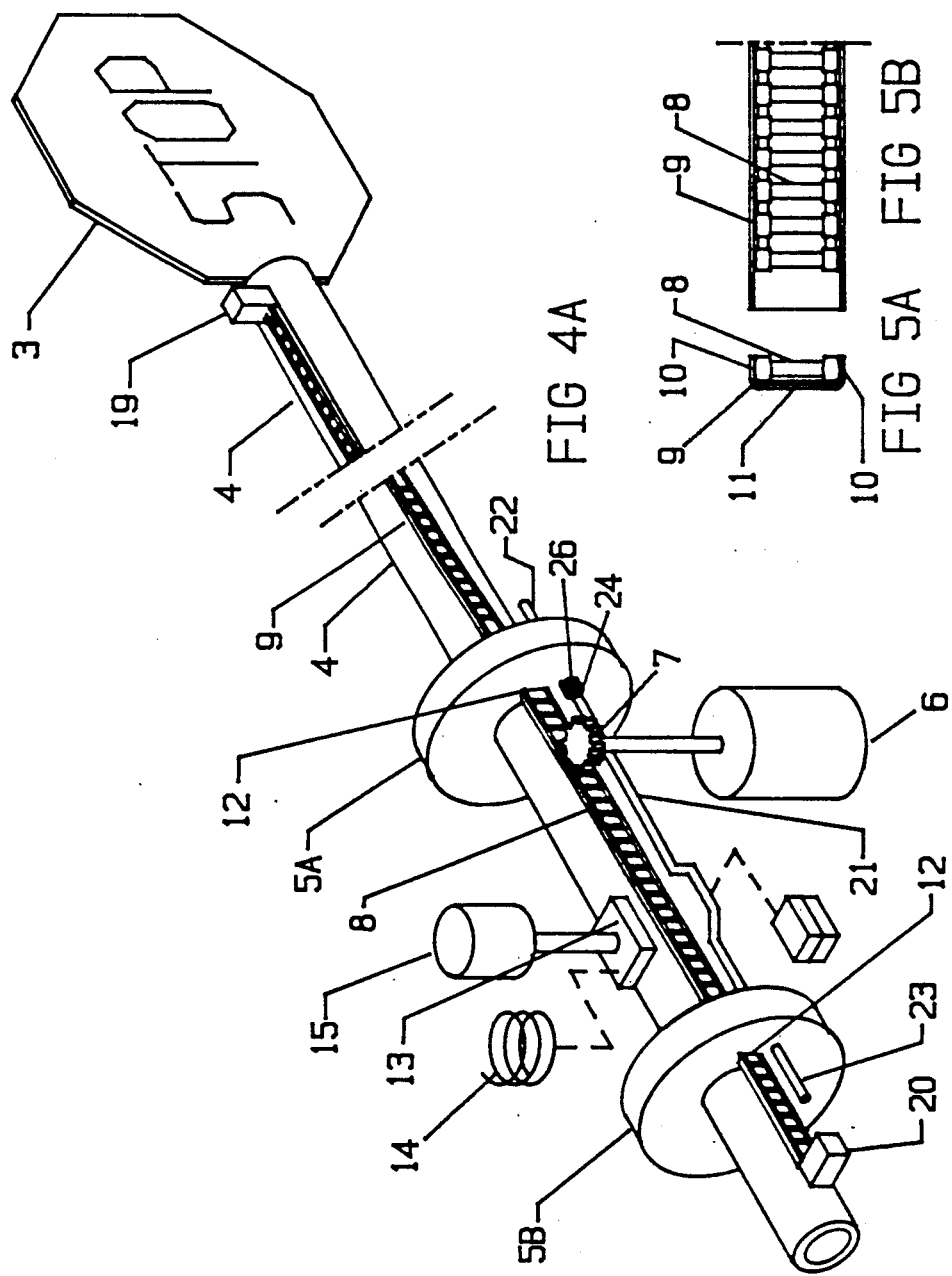

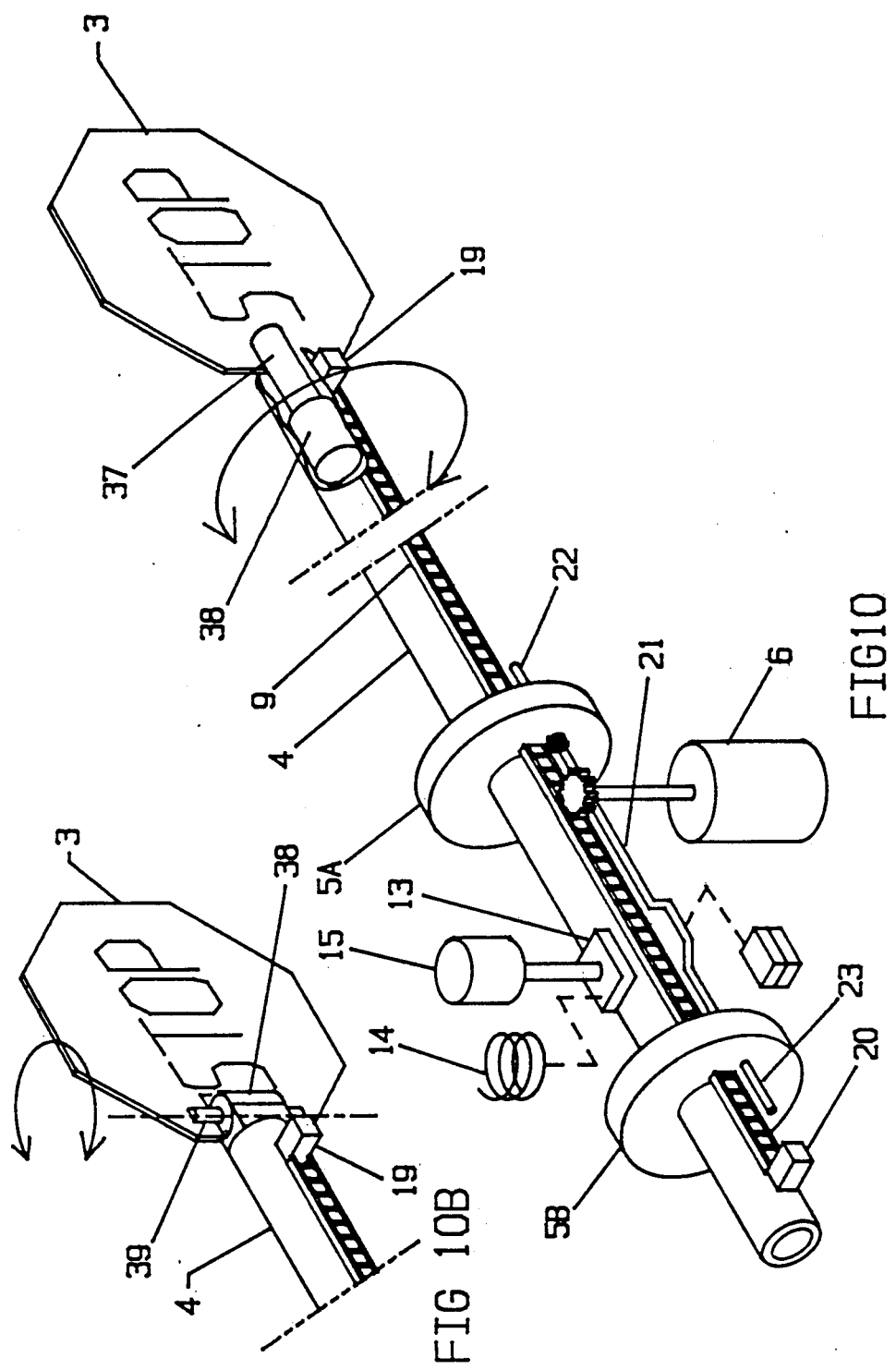

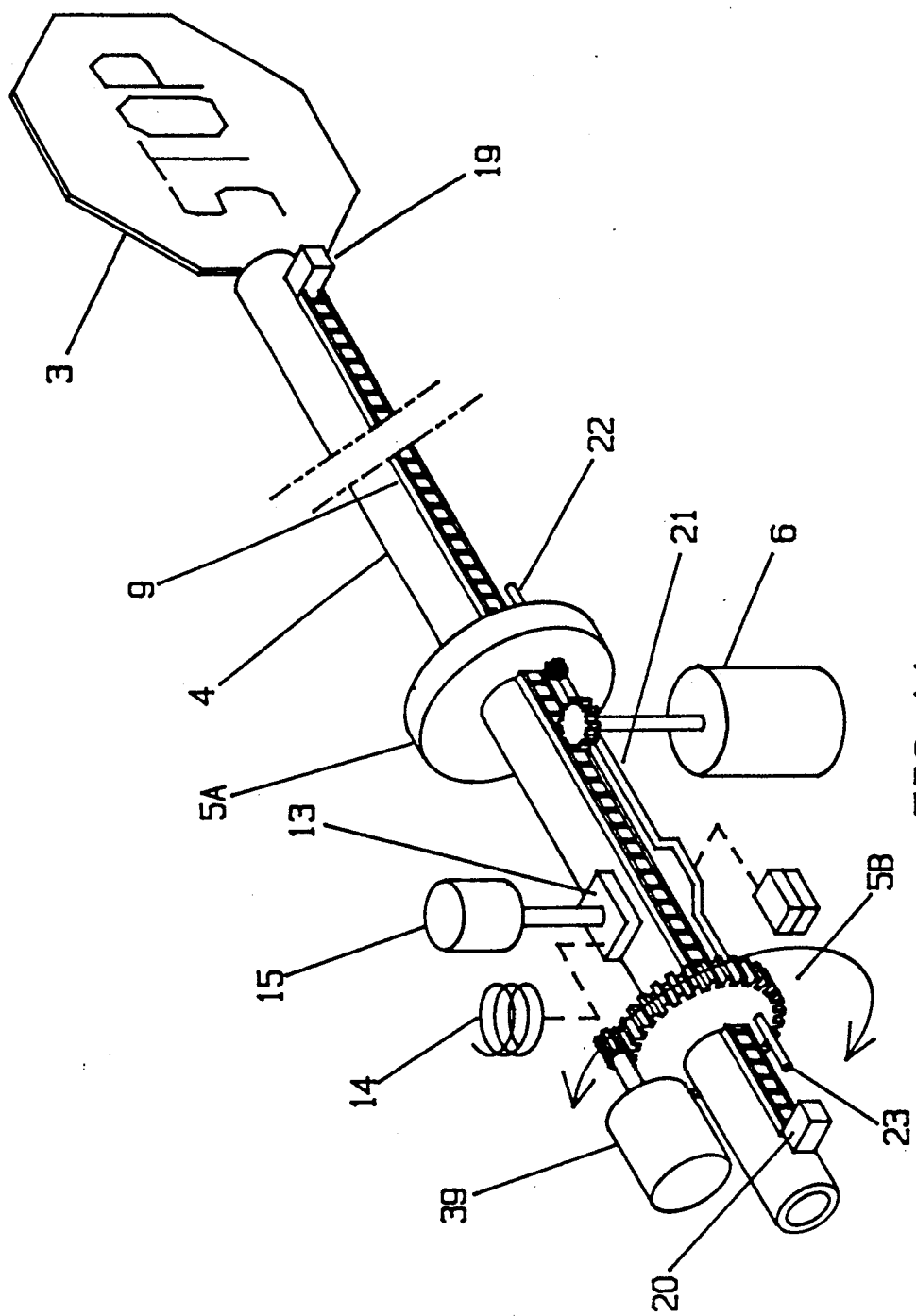

TRAFFIC CONTROL DEVICE FOR SCHOOL BUSES

BACKGROUND OF THE INVENTION

This invention relates to a traffic signalling device, and in particular to a device for mounting on a school bus which provides improved safety to passengers crossing the street in front of the bus.

It is the law in many jurisdictions that oncoming traffic or traffic passing a school bus must stop in order to allow passengers who might wish to cross the street in front of a loading or unloading stopped bus, to cross with safety. In order to advise such traffic that the school bus is loading or unloading, the bus usually carries a stop sign, which may or may not include flashing lights. The stop sign is usually hinged to the side of a bus, and deployment is enabled by the bus driver. The stop sign is rotated about a vertical axis so as to lie flat against the bus when it is not to be displayed, e.g. when the bus is moving, and is rotated so that the plane of the sign faces oncoming or passing traffic when deployed. Safety signs of this type are described in U.S. Pat. No. 4,559,518 issued Dec. 17th, 1985, U.S. Pat. No. 4,339,744 issued July 13th, 1982, U.S. Pat. No. 3,094,683 issued June 18th, 1963, U.S. Pat. No. 3,133,265 issued May 12th, 1964 and U.S. Pat. No. 4,138,668 issued Feb. 6th, 1979. The stop sign extends outwardly from the bus not much more than the width of the sign.

Buses loading or unloading passengers typically stop in the vehicle driving lane of a road. Consequently while automobiles in the overtaking lane usually see the stop sign and stop behind the school bus, automobiles in the oncoming lane usually do not see the sign and thus do not stop. This creates a very dangerous situation for school bus passengers crossing the road, who usually are small children expecting all traffic to stop.

U.S. Pat. No. 1,786,678 issued Dec. 30th, 1930 describes a long arm hinged to the side of the bus which can be extended outwardly into an overtaking lane of traffic. The arm is hinged so that it lies flat against the side of the bus when it is not deployed. While this traffic control arm extends much further into the line of sight of oncoming traffic, the deployment means is such that with substantial decelerating forces by the bus, the arm can automatically be deployed directly into the front of overtaking traffic, and therefore is subject to being smashed. In addition, it is located about halfway down the side of the bus and is subject to being smashed by any vehicle carrying a driver who does not notice it.

U.S. Pat. No. 4,543,905 issued Oct. 1st, 1985 describes a portable traffic signal having two telescopic arms, one of which raises a traffic signal to a position above the height of oncoming traffic, and the other of which carries the traffic signal outwardly directly above the oncoming lane of traffic. If this structure were mounted on a school bus, it would achieve the desired result of locating a traffic signal in the line of sight of oncoming as well as overtaking traffic, but it is not suitable for this function for several reasons. Firstly, the mechanism of the invention is complex and requires retraction along two separate axes. This takes an inordinately long amount of time, and the bus driver is usually in a great hurry. The retraction and deployment mechanism thus would be unsuccessful for use on a school bus since the bus driver would likely move his bus before the arms are fully retracted, causing acceleration forces to damage it.

If only the top telescopic beam of that design were used, mounted on the roof of a school bus, the traffic signal would be damaged when the school bus moves, due to acceleration, deceleration and wind forces on the traffic signal, as it is anchored at only one point, and the display has its plane constantly perpendicular to the axis of the traffic lane.

Due to the telescopic nature of the structure, a special pulley mechanism is required which takes up a large amount of space and is subject to binding or slackening due to differential heating or cooling in extremely cold or hot weather, wear of the cables, and jamming due to ice accumulation on the telescoping structural elements.

The result of the above is that the structure would be prone to damage when used on a school bus used in all types of weather, which repeatedly starts and stops, which rapidly loads and unloads passengers and which requires a robust traffic control sign which is repeatedly deployed and retracted.

SUMMARY OF THE INVENTION

The present invention is a traffic control devide for use on school buses which locates the traffic control sign in the normal field of view of oncoming traffic, yet is robust, can be extended and retracted automatically and rapidly, and substantially does not suffer wind, acceleration or deceleration damage during movement of the school bus. Accordingly it reliably provides substantially increased safety over commonly used school bus traffic control signs while at the same time allowing the school bus operator to move rapidly from one bus stop to the next without damaging the traffic control device.

In accordance with a preferred embodiment, the traffic control device for mounting on or adjacent the roof of a vehicle is comprised of a traffic control display such as a stop sign, apparatus for supporting the display with its plane in a horizontal plane adjacent the vehicle, and apparatus for thrusting the display outwardly from the side of the vehicle along an axis orthogonal to the axis of the vehicle; while rotating the display through 90° to change the facing direction of the display from a horizontal plane to a plane visible to the traffic.

Preferably the supporting means is comprised of a beam, the display being fixed to the end of the beam. The rotating means is comprised of the means for thrusting the beam outwardly from the vehicle whereby the display is rotated through 90° while being moved from a position adjacent the vehicle to a position in the direct line of sight of drivers of oncoming traffic.

Due to the rotation of the traffic control display, when retracted it lies in a horizontal plane which contains the axis of movement of the school bus. As a result there is virtually no wind resistance to the display while the vehicle is moving, substantially reducing or eliminating the possibility of damage caused by wind when the vehicle is moving. In addition, in this position the display is retained adjacent the roof of the vehicle, and as will be seen below, the bending moments caused by acceleration and deceleration of the bus on the beam carrying the display are minimal.

Yet in the deployed (extended) position, once the beam has been thrust outwardly sideways from the bus, the display automatically rotates so that it faces the line of sight of drivers of oncoming vehicles. Deployment is effected, however, when the bus is stopped, and bending forcing due to acceleration or deceleration of the bus are absent, nor is there the force of the wind on the display caused by movement of the bus. Thus the sign can be deployed without substantial risk of damage. However since it is thrust outwardly into the line of sight of drivers of oncoming vehicles by means of the beam, far from the side of the bus, it is much more noticeable than prior art displays, substantially increasing the likelihood that drivers of oncoming traffic will notice the display and will stop their vehicle. This results in substantial increase in safety for passengers crossing the road.

BRIEF INTRODUCTION TO THE DRAWINGS

A better understanding of the invention will be obtained by reference to the detailed description below, in conjunction with the following drawings, in which:

FIG. 1 is a front elevation of a school bus and an oncoming passing car prior to deployment of a traffic control sign, FIG. 2 is similar to FIG. 1, but with a standard traffic con stop sign shown deployed, FIG. 3 is similar to FIG. 1 but illustrates a traffic control stop sign deployed in accordance with the present invention, FIG. 4A is an isometric partly schematic view of the present invention, FIG. 4B is a side elevation of the beam of the present invention showing a variation of the beam bearings, FIGS. 5A and 5B are end and side views respectively of a chain carrier and chain used in the preferred embodiment invention, FIG. 6 shows a detail of switch operating means of the present invention, FIGS. 7A-7D are side views of different structures that can be used to drive the beam of the present invention, FIG. 8 shows various types of beam cross-sections that can be used in various embodiments of the present invention, FIG. 9 is an electrical schematic diagram for driving the beam extending and retracting motor, FIG. 10 is an isometric, partly schematic view of another embodiment of the invention, FIG. 10A is an isometric, partly schematic view of still another embodiment of the invention, FIG. 10B is an isometric, partly schematic view of a coupling structure of the display and the beam in accordance with a variation of the invention, FIG. 11 is an isometric, partly schematic view of yet embodiment of the invention, and FIG. 12 is an isometric, partly schematic view of another embodiment of the invention.

DETAILED DESCRIPTION OF THE INVENTION

In the following description the traffic control display used in the present invention will be referred to as a stop sign. However it should be noted that flashing lights, or other notices or displays can be used in place of the sign or of the word "STOP" within the meaning of the term.

Figure 1:
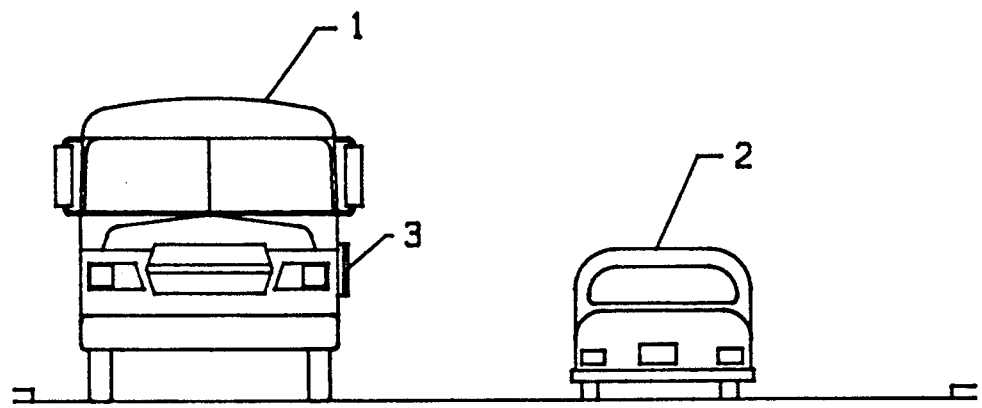

Turning to FIG. 1 a school bus 1 is shown parked beside a curb, ready to load or unload passengers. An automobile 2 is shown in an oncoming lane of traffic, passing the school bus. Passengers typically cross the road in front of the bus, and the moving automobile 2 poses a dangerous hazard. A stop sign is not yet deployed, and lies parallel to the side of the bus.

Figure 2:
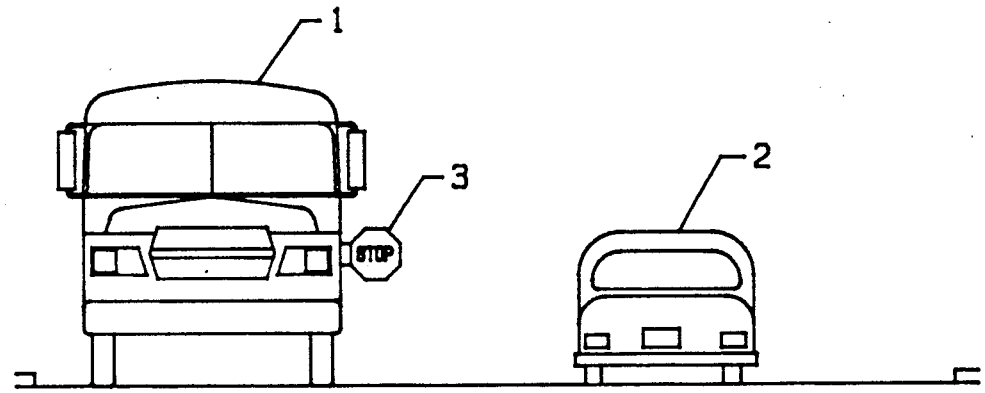

FIG. 2 illustrates the school bus with a common type of stop sign 3, as described for example in U.S. Pat. No. 4,559,518 referred to earlier. The stop sign, which had been folded flat against the side of the bus prior to deployment as shown in FIG. 1, has been rotated in FIG. 2 about a vertical axis and now faces overtaking traffic. It should be noted that from the point of view of the driver of the automobile 2, the stop sign blends in with the side of the bus and is difficult to notice. Further, since the attention of the driver of automobile 2 is mainly directed ahead, the stop sign 3 is seldom noticed. As a result automobile 2 very often does not stop, posing great danger for children crossing the road.

Figure 3:
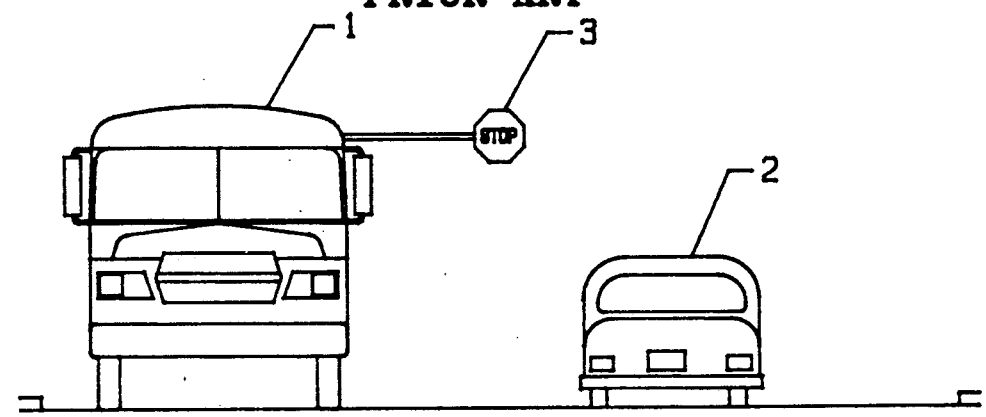

FIG. 3 illustrates the school bus 1 carrying the present invention. It will be noted that stop sign 3 extends far out from the bus into the line of sight of vehicle 2. It is located substantially higher than the height of normal passenger vehicles, substantially reducing the possibility of vehicles which do not stop, and overtake the bus, from smashing the stop sign. In addition, the stop sign is located in a position far out from the bus, where the drivers of oncoming vehicles often expect to see a traffic signal, immediately ahead or to the side of its lane of traffic. Because of the location, the stop sign is much more visible than the stop sign of the prior art, does not appear to blend in with the side of the vehicle, and the driver of the oncoming automobile 2 is much more likely to stop, increasing the safety for passengers crossing the road.

Details of the preferred embodiment of the present invention are shown in FIG. 4A. The stop sign 3 is fixed to the end of a long beam 4. The beam is supported by support means preferably formed of spaced bearings 5A and 5B. The bearings can be clamped to the roof of the bus.

At this point it should be noted that the bearings can be fixed to the upper surface of the roof, or they can be mounted on the underside of the roof of the bus, within the bus, with the beam extending through a hole in the side of the bus just below the roof (which is the case shown in FIG. 3). In the latter case a pocket for retaining the stop sign parallel to the plane of the roof can be located adjacent the hole in order to accommodate the stop sign as it is retracted therein.

With a beam 4 of e.g. six and one-half feet in length, the bearings can be spaced e.g. fifteen inches apart, and will serve to support the beam. With the beam retracted or extended, about five feet of beam will extend outwardly from bearing 5A, with the stop sign 3 extending from its end. Different lengths of beam and different bearing spacings could be used depending on the width of the bus, the desired extended position of the stop sign, and the strength of the bearings and of the beam.

It is preferred that the total length of the beam and the stop sign should not exceed the width of the bus, although in some circumstances a combined length which is longer than the width of the bus may be desirable. In one successful embodiment the beam 4 was formed of two inch diameter fiber reinforced plastic circular cross-section cylindrical tube and the bearings were formed of high density polyethylene plastic having internal cylindrical holes of just slightly greater diameter than the outside diameter of the pipe. However other bearing materials could be used, to accommodate sliding of the beam 4 with minimal friction.

In order to thrust the beam outwardly and to retract it, a motor 6, preferably a 12 volt DC motor operating from the 12 volt electrical power supply of the bus has a gear 7 at the end of its motor shaft, which couples to and drives a chain 8 which is fastened along the beam 4. Thus as the motor 6 is powered and gear 7 rotates, with the gear being coupled to chain 8 which is fixed to beam 4, it drives beam 4 in one direction or the other depending on the direction of rotation of the motor.

The stop sign 3 should be rotated through 90° in order that it should present its edge to the direction of movement of the bus when in its retracted position. This is accomplished by locating the chain 8 within a chain carrier 9, best seen in FIGS. 5A and 5B. The chain carrier 9 is typically formed of a U-shaped channel having sides 10 and a bottom 11.

While the above described structure is a convenient form of the chain carrier, the most important parts of the chain carrier are the sides 10 (guide walls), for the reasons which will become evident below. In case the sides 10 can be fastened in a spaced apart position enclosing the chain 8 between them to the beam 4, without utilizing the bottom, this will be sufficient. However a U-shaped chain carrier described earlier facilitates easy fastening of the structure to the beam 4 by means of flat head screws through the bottom 11. The chain 8 can be, for example, plastic chain adherent to or molded to the chain carrier, or can be otherwise fastened, e.g. by spaced pins through the sides 10 of the chain carrier and the chain linkages, or by other means that will be evident to a person skilled in the art.

Each of the bearings 5A and 5B should contain rectangular cutouts 12 to accommodate the chain carrier and chain fastened along the side of the beam 4. The width of the cutouts should be just slightly greater than the outside dimension of the sides of the chain carrier, and their depths should be just slightly greater than the height of the sides of the chain carrier (which themselves should be higher than the thickness of the chain contained therein). The rectangular cutouts 12 thus form guideways, since once the beam 4 with the chain carrier 9 is in position within the bearings 5A and 5B and the guideways, with the bearings fixed (to the roof of the bus), the beam 4 cannot rotate except under the control as will be described below.

In order to rotate the beam 4, and thus the stop sign 3 through 90°, the chain carrier 9 is spirally fixed to the side of the beam 4 with a 90° or greater twist from one end to the other. The twist should be 90° from one end of the chain carrier to the other over the length which passes rectangular cutout 12 in bearing 5A.

As a result as motor 6 rotates and gear 7 drives chain 8 and thus beam 4 forward, the twist in chain carrier 9 bearing against the guideways formed of rectangular cutouts 12 causes the beam 4 to rotate through 90°. This rotates stop sign 3 through 90° as the beam 4 is thrust from a retracted to an extended position to the right, in FIG. 4. The opposite will occur when motor 6 reverses direction and the beam is retracted to the left, causing the beam to rotate in the opposite direction and stop sign 3 to rotate back again to its initial position. It is of course desired that the initial position of the stop sign should be with its plane in the direction of movement of the bus. Bearings 5A and 5B should be fixed to the top of the bus laterally along an axis perpendicular to the axis of the bus.

In order to maintain the beam and stop sign safely in the retracted or extended position, a solenoid operated brake is used. In the preferred embodiment this is comprised of a brake pad 13 which is forced against the beam side by means of a spring 14. When the beam is to be extended or retracted, a solenoid 15 is operated, retracting the brake pad 13 against the spring 14, allowing motor 6 to drive the beam outwardly or inwardly.

Figure 4B:
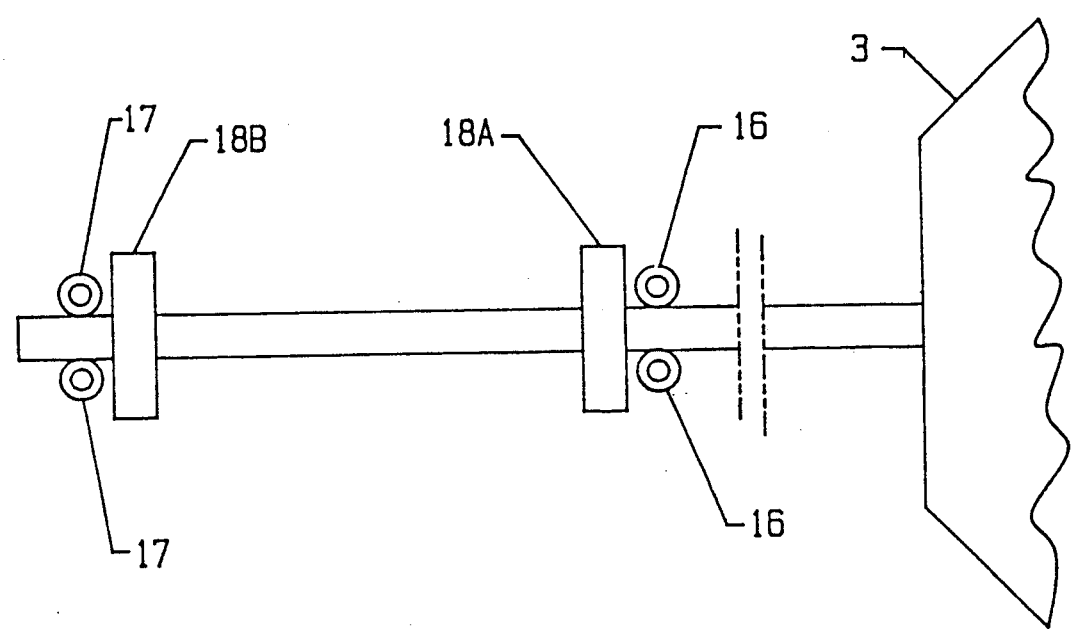

While bearings 5A and 5B have been described above as preferably being formed of high density polyethylene plastic, which form both the bearings and guideways, FIG. 4B illustrates another embodiment, which serves to minimize wear of the bearings.

In FIG. 4B the bearings are formed of two pairs of rollers 16 and 17 having horizontal axes, which support the beam in a horizontal plane. As the beam is extended or retracted, rollers 16 and 17 clearly are subjected to the major bending moment forces and friction of the beam.

Guideways 18A and 18B which are similar in structure to bearings 5A and 5B are, however, used in order to locate the beam laterally, and also to provide the guiding structure for the chain carrier in the manner as described earlier.

Figure 6:
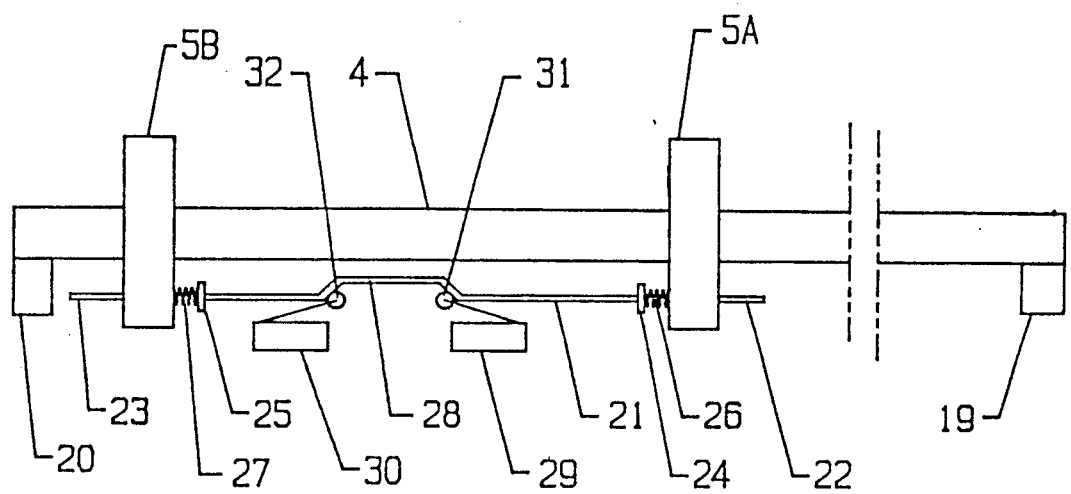

Turning to FIG. 6, a side view of a mechanical beam operating motor limit switch structure is shown. FIG. 6 should be viewed in conjunction with FIG. 4A.

Adjacent the ends of beam 4 actuator blocks 19 and 20 located in separate planes extend outwardly from the sides of the beam. An actuator rod 21 extends through holes in bearings 5A and 5B (or guide ways 18A and 18B), in a direction parallel to the axis of beam 4. The actuator rod 21 protrudes to opposite regions outside of the bearings or guideways, exposing fingers 22 and 23. The location of the actuator blocks are such that they contact the fingers 22 and 23, and are thus preferably positioned at the ends of the chain carrier. The actuator rod 21 is held in position by means of washers 24 and 25 fixed to locations on the actuator rod 21 slightly inwardly of the bearings 5A and 5B, the washers being spaced from the adjacent surfaces of bearings 5A and 5B by means of helical springs 26 and 27 located coaxially with actuator rod 21. The spacing of the washers and springs are such that the rod 21 can be pushed to one side or the other of a central position, but will be automatically returned to the central position when the force applied to fingers 22 and 23 is removed.

As the beam 4 is drawn and moves to the extended position, the actuator block 20 thus eventually comes into contact with finger 23, pushing actuator rod 21 to the right. Conversely as beam 4 is retracted, actuator block 19 comes into contact with finger 22, pushing actuator rod 21 to the left.

The actuator rod 21 contains an open U-shaped bend 28, having sloped sides. Actuating arms 31 and 32 of normally closed microswitches 29 and 30 ride on the sloped sides of actuator rod 21 so that when finger 22 is contacted by actuator block 19 and is forced to the left, the actuator arm of microswitch 29 is operated, opening the switch. Similarly as actuator block 20 contacts finger 23 and pushes actuator rod 21 to the right, the actuating arm 32 of microswitch 30 is forced downwardly operating and opening microswitch 30.

Figure 9:
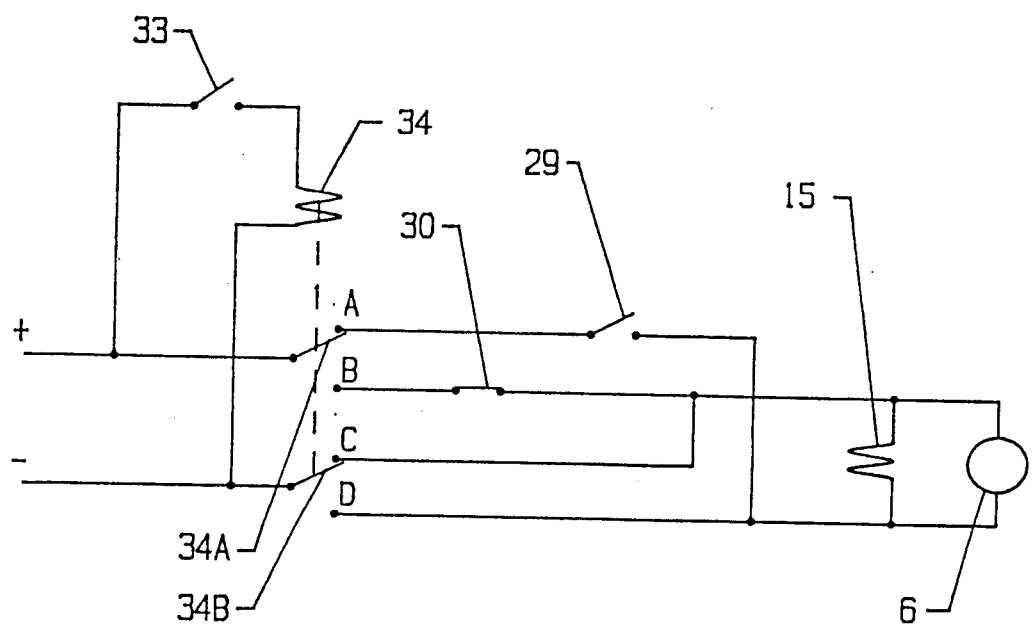

Operation of the motor 6 will now be described, with reference to FIGS. 4A, 6 and 9. FIG. 9 illustrates the electrical circuit with the beam 4 in retracted position, with actuator block 19 against finger 22, actuator rod 21 pushed to the left, and microswitch 29 thus operated (opening the switch). Microswitch 29 is shown in FIG.

9 as open. Similarly microswitch 30 is shown in FIG. 9 as closed.

The bus driver closes a remote switch 33 located adjacent his seat, which closes a circuit through the coil 34 of a double pole double throw relay. As a result the transfer contacts 34A and 34B move from contacts A and C to contacts B and D. This closes circuits through motor 6 and solenoid 15. As a result solenoid 15 operates, retracting the brake 13 from beam 4, and motor 6 begins rotating. This causes the beam 4 to be driven as described earlier, and begin extending from its retracted position, thrusting stop sign 3 outwardly toward the lane of traffic it is intended to control, while rotating it through 90° as described earlier. As the beam 4 begins moving, actuator block 19 moves outwardly and relieves pressure from finger 22. The removal of pressure from finger 22 permits actuator rod 21 to be pushed back to its central position by the action of springs 26 and 27 and washers 24 and 25 as described earlier. When actuator rod 21 is returned to the central position illustrated by FIG. 6, microswitch 29 is changed from an open state to a closed state.

When the beam 4 reaches its extended position, actuator block 20 contacts finger 23, forcing it to the right, causing operation of microswitch 30. Microswitch 30 opens, causing the power to be removed form the motor and the brake solenoid. The brake is thus applied by spring pressure of spring 14, stopping the motion of the beam.

When the switch 33 is opened, relay 34 is deenergized, and transfer contacts 34A and 34B are returned to contact terminals A and C. Power is now supplied to switch 29 rather than to switch 30. It may be seen that contact C and switch 29 are connected to the opposite terminals of motor 6 than were contact D and switch 30. Thus the polarity direction of the power supplied to motor 6 is reversed. Since with the position of actuator rod 21 operating switch 30, thus opening it, and with switch 29 unoperated, and therefore in its normally closed position, power is again applied to motor 6 and the solenoid 15, releasing brake 13 and operating motor 6, but this time in the reverse direction. This causes retraction of the beam 4 and rotation of stop sign 3 into a horizontal plane. The beam will retract until actuator block 19 contacts finger 22, operating (and thus opening) microswitch 29. This removes power from motor 6 and solenoid 15, causing the brake to operate, stopping all movement of the beam 4 and readying the structure for the next extension cycle.

Switch 33 can be merely a toggle switch having one operated direction labelled "forward" and the other operated position labelled "reverse". Alternatively, switch 33 can be incorporated into the door operating mechanism such that when the school bus door is open, switch 33 is in one position (open or closed) and when the door is closed switch 33 is in the opposite position. The operator need merely move the switch to one or the other direction and the beam will extend or retract, and stop automatically.

Figure 7A:
Figure 7B:
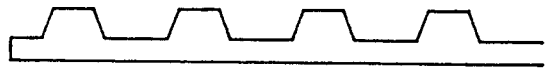
Figure 7C:
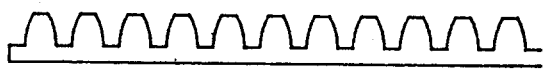

Turning now to FIGS. 7A and 7B various forms of structure for coupling the motor to the beam are shown, in side view. In FIG. 7A the side view of chain is shown which contains links that can be driven by gear teeth of gear 7, driven by motor 6. FIG. 7B illustrates in side view a toothed belt, which can be similarly driven by the teeth of gear 7. FIG. 7C illustrates a rack which can be driven by gear 7. In all of the above cases the chain, belt or rack should be contained within a chain carrier or the equivalent to be guided by the guideway.

Figure 7D:
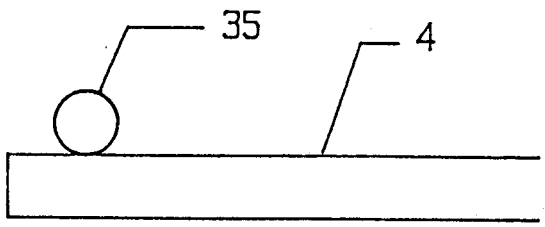

FIG. 7D illustrates a friction driving member 35 driven by motor 6, which bears directly against the side of beam 4, which provides another means for driving the beam outwardly and inwardly. In such case rotation of the beam can be obtained by some other means, such as by an external fixed key sliding in an axial spiral slot in the beam, or by means of a variation in the shape of the beam itself, as will be described below.

Figure 8:
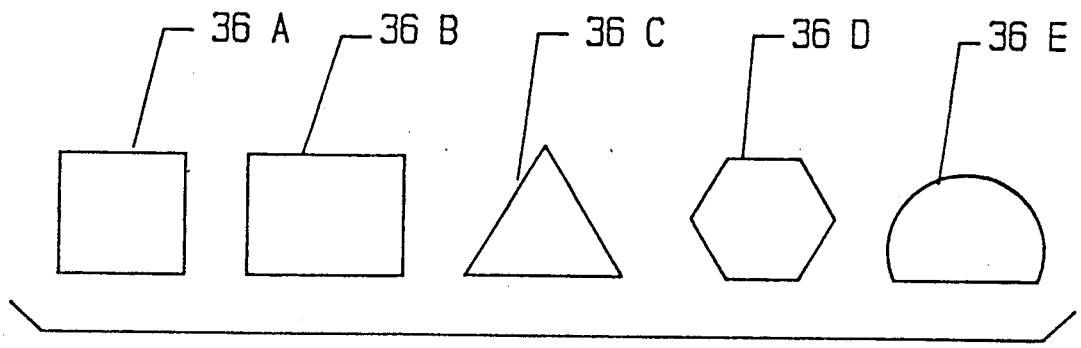

While the structure described above has been directed to a circular cross-section beam, other embodiments of the invention can be built by using a different cross-section beam. In FIG. 8, for example, a square cross-section beam 36A, a rectangular cross-section beam 36B, a triangular cross-section beam 36C, a hexagonal cross-section beam 36D and a partially circular cross-section beam 36E are shown. These shapes are not intended to be limiting, as other non-circular cross-section beams could alternatively be used. In these cases the beam itself should be twisted at least 90°, and the openings in bearings 5A and 6B should be made to conform to the cross-sectional shape of the beam. Because the openings are conformed to the particular non-circular shape of the beam, the beam is prohibited from rotating. Accordingly the openings themselves form the guideways for the beam. The twist in the beam causes rotation of the beam in interaction with the openings in the bearings 5A and 5B as the beam is driven to be extended or retracted. Since the beam can be driven by means of a frictional coupling to the motor, as in the structure shown in FIG. 7D, in this case there is no requirement for a chain carrier interacting with guideway 12. Other means for driving the beam outwardly and inwardly may now occur to a person skilled in the art understanding this invention.

There are several alternative ways that display may be rotated and a similar effect of thrusting the display outwardly and rotating it into a display position are achieved.

Considering FIG. 10, for example, a structure generally similar to that shown in FIG. 4A, with similar reference numerals is shown. However the chain carrier 9 in this case is not spirally wound around the beam 4, but extends parallel to the axis of the beam.

In the present embodiment, the traffic control device 3 (e.g. the stop sign) is fastened to a horizontal rod 37 which extends into an axial hole within the beam 4. A motor 38 is coupled through a gear reduction mechanism to the rod.

In operation, the traffic control device is horizontally disposed when the beam is retracted. When the beam is extended as described earlier, due to the chain carrier 9 being disposed parallel to the axis of the beam 4, it does not rotate, and merely extends outwardly from the school bus.

Power is applied to the motor 38 contained within the hole to rotate the traffic control device by 90°, so that it faces traffic. The rotation can occur after the beam has been extended, or more preferably, during the initial movement interval as the beam becomes extended.

Figure 10A:
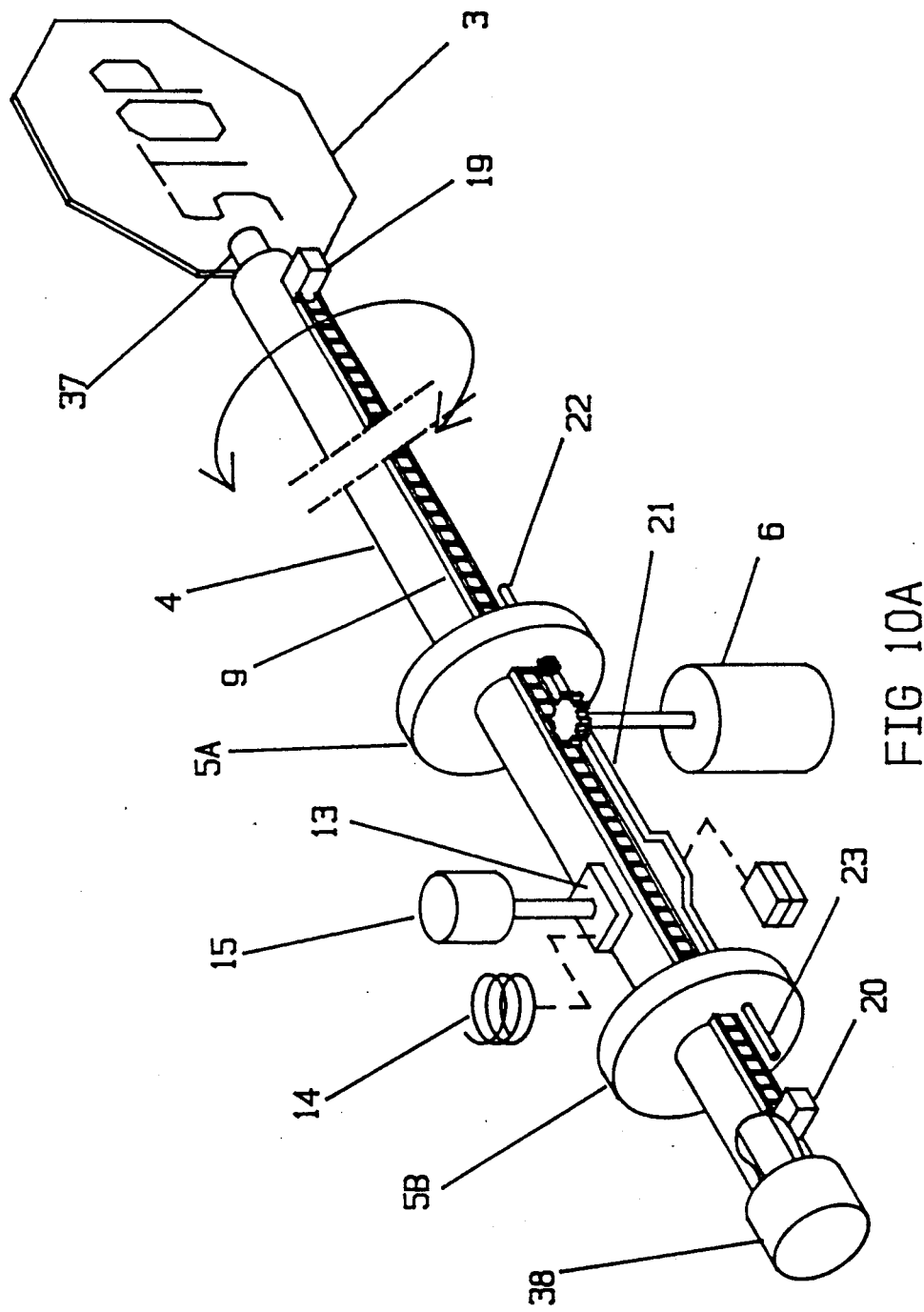

In a variation of the above embodiment as schematically illustrated in FIG. 10A, the rod 37 to which the traffic control device is mounted extends completely through to the inward end of the beam. The motor is located outside, or alternatively just inwardly of the end of the beam opposite to the end at which the traffic control device 3 is located.

According to another embodiment, as shown schematically in FIG. 10B, the traffic control device 3 is mounted by means of a hinge to the end of the beam 4 of FIG. 10, the hinge 39 axis being perpendicular to the axis of the beam. A motor 38 fastened to the end of the beam is coupled to the traffic control device, rotating it about the vertical axis of the hinge. The traffic control device in this case is rotated so that it lies parallel to the side of the bus when the beam is retracted. The motor 38 which rotates the traffic control device 3 about the hinge axis can be actuated to rotate the device 3 at the time that the beam has been extended, or more preferably, as it begins to be deployed outwardly into traffic.

It should be noted that rather than a motor, an electromechanical actuator, such as a solenoid, can be used to rotate the traffic control device.

In accordance with another embodiment as shown in FIG. 11 the traffic control display is fixed to the end of the beam, the chain carrier is disposed parallel to the axis of the beam, and at an appropriate time, such as when the beam is fully extended or fully retracted but when it is to be extended, the entire beam is rotated about its axis by means of a motor 39 or electromechanical means. This can be effected by rotating the bearings 5A and 5B, by the motor 39 being coupled to the circular periphery of one. The entire axial driving and brake mechanism should also be rotated.

Figure 12:
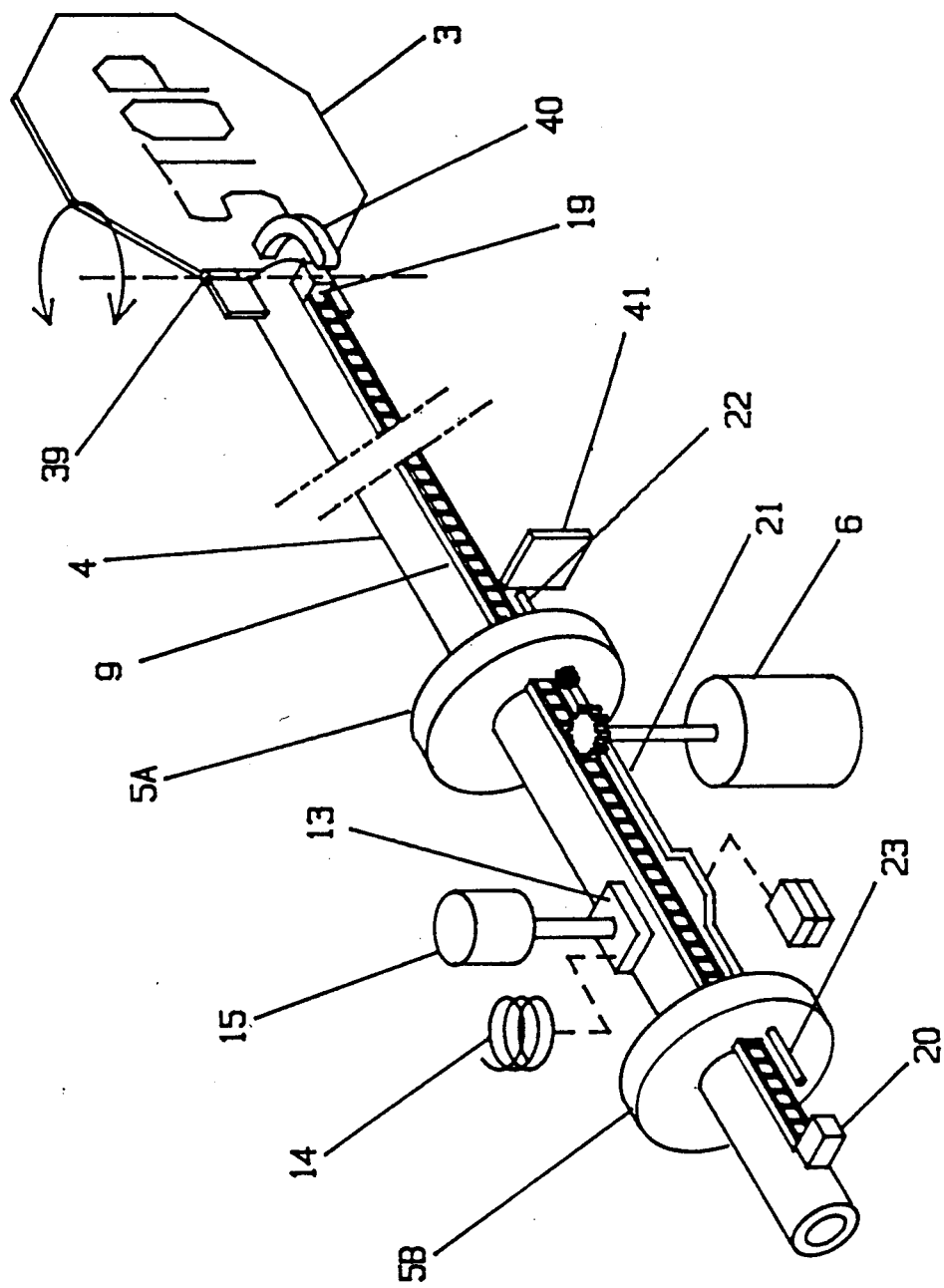

According to still another embodiment as shown in FIG. 12, a structure similar to FIG. 10B is used, but instead of using a motor to rotate the traffic control device 3, a mechanical pusher arm 40 is used. The pusher arm 40 is preferably in the shape of a curve, e.g. ¼ circle, which has one end fixedly butted against the device 3 adjacent the hinge and the other end curved toward a line parallel to the axis of the beam. A fixed stop plate 41 is located a distance from the arm 40 equal to the travel distance of the beam from its extended to its retracted position.

The device 3 is spring loaded (springs not shown) to its display position, with its plane parallel to the axis of the beam. Other forms of pusher arms or analogous structures could be used in substitution for the particular one shown.

When the beam is drawn inwardly (to the left, in FIG. 12), the end of the pusher arm 40 comes into contact with the stop plate 41, and with further movement of the beam, rotates device 3 from its display position to a position about 90° from its display position. At this point the beam control elements stop further movement of the beam.

The end of the pusher arm is located in an advanced location toward the other end of the beam 4, relative to the face of the block 19, a distance such that the motor shut off switch is operated by block 19 hitting the rod end 22 when the device 3 is in its position about 90° from its display position (i.e. the stop sign is folded into a position parallel to the side of the bus).

During the next cycle, as the beam is moved outwardly from the vehicle (to the right), the pusher arm 40 is released from the stop plate 41, allowing the device 3 to rotate under spring pressure to its display position shown in FIG. 12.

Other ways of rotating the beam or the traffic control display independently may become evident to a person skilled in the art once the present invention has been understood.

The present invention thus provides a traffic stop sign which is useful for a school bus and which can be automatically extended a long distance from the roof of the school bus into the line of sight of drivers of oncoming traffic, yet retracts and is stored in a plane which does not interact with the wind as the bus moves. The structure is strong and is easy to deploy by the bus driver. It deploys and retracts very quickly, in seconds, allowing the bus driver to quickly move along his route. It is located on or just below the roof of the bus, above the height of normal passenger cars, and thus is unlikely to be hit. The structure avoids the uses of winches and cables, and since it can be located under the roof of the bus, it avoids damage caused by ice and snow, although the structure may be retained in a protective housing above the roof of the bus. An easy to use and structurally strong, foolproof device results which, because of its increased visibility, increases the safety for passengers, particularly for small children, crossing the road in front of the stopped school bus.

The stop sign can be hinged, to limit damage in case a truck having sufficient height contacts it from below. The motor can contain a slip clutch to limit the force on the beam, in the unlikely case of jamming. The stop sign can be pivoted to prevent rotational stress in very high winds. The electrical circuit can accommodate an emergency switch to cause the beam to be retracted from whatever its position in the event of an emergency. All these as well as other embodiments using the principles described herein are considered to be within the sphere and scope of the invention, as defined in the claims appended hereto.

The embodiments of the invention in which an exclusive property or privilege is claimed are defined as follows:

1. A traffic control device for mounting on or adjacent the roof of a vehicle, comprising a traffic control display, means supporting the display with its plane in a horizontal plane adjacent the vehicle, and means for thrusting the display outwardly from the side of the vehicle along an axis orthogonal to a front to rear axis of the vehicle while rotating the display through 90° to change the facing direction of the display from a horizontal plane into a plane visible to traffic.

2. A traffic control device as defined in claim 1 in which the supporting means is comprised of a beam, the display being fixed to the end of the beam, and in which the thrusting means is comprised of said means for thrusting the beam outwardly from the vehicle whereby the display is rotated through 90° while being moved from a position adjacent the vehicle to a position removed from the vehicle a distance at least a major fraction of the width of the vehicle, into the direct line of sight of drivers of oncoming traffic.

3. A traffic control device as defined in claim 2 including spaced beam support means for being fixed to the vehicle, for supporting the beam horizontally and laterally of the vehicle at two spaced locations.

4. A traffic control device as defined in claim 3 including a guideway adjacent the beam, for causing rotation of the beam as it is thrust outwardly from the vehicle, while the beam is supported by the support means.

5. A traffic control device as defined in claim 4 in which at least one of the beam support means contains said guideway.

6. A traffic control device as defined in claim 4, in which the beam support means is comprised of beam supporting rollers.

7. A traffic control device as defined in claim 4, in which the guideway is comprised of spaced bearings for said beam, one of the bearings in each said beam support means, the bearings each having an annular hole dimensioned to conform to the outer cross-sectional shape of the beam.

8. A traffic control device as defined in claim 7 in which the shape of the beam is non-circular, and has a twist of about 90° from one end to the other of a portion which passes through said hole in each bearing of the guideway as the beam is thrust fully outwardly, whereby the shape of the beam causes the beam to rotate in the guideway, rotating the display.

9. A traffic control device as defined in claim 7 in which the thrusting means is comprised of a motor, the beam having a circular periphery in cross-section, a pair of spaced, parallel guide walls fixed to and extending along substantially the length of the beam, the guide walls being spirally rotated at least about 90° along the surface of the beam over its length, the guideway further comprising a notch located in each of the beam support means next to the annular hole having width slightly wider than the distance from the outside of one of said guide walls to the other, whereby the guide walls are guided by said notches in each of the beam support means, and means contained between the guide walls coupling the beam to the motor whereby the beam can be driven thrust along the guideway, and rotated 90° by interaction of the guide walls and said notches.

10. A traffic control device as defined in claim 9 in which the guide walls are formed of a chain carrier and the means contained within the chain carrier is a chain extending substantially from one end of the chain carrier to the other.

11. A traffic control device as defined in claim 9 in which the means contained between the guide walls is a toothed belt.

12. A traffic control device as defined in claim 9 in which the means contained between the guide walls is a rack.

13. A traffic control device as defined in claim 9, 10, 11 or 12, further including remote control means for starting the motor, means fixed to the beam for stopping the motor when the display is at its maximally extended and maximally retracted positions, said remote control means including means for reversing the direction of the motor.

14. A traffic control device as defined in claim 2, 3 or 9 in which the portion of the beam thrust outwardly is at least 5 feet in length.

15. A traffic control device as defined in claim 2, 7 or 8 in which the thrusting means is comprised of a motor coupled to the beam for driving the beam outwardly and inwardly of the vehicle, and means for automatically stopping the motor when the beam is at its maximally extended and retracted positions.

16. A traffic control device supported by the roof of a vehicle comprising a single beam retaining traffic control display means, the beam having length at least a major fraction of the width of the vehicle, bearings for supporting the beam laterally of the axis of the vehicle, and a motor coupled to the beam for thrusting the beam outwardly laterally of the vehicle or retracting it to a position adjacent the roof of the vehicle while the beam is supported by said bearings.

17. A traffic control device as defined in claim 16 including means for rotating the beam 90° while the beam is being fully extended or fully retracted whereby the display means is rotated from a horizontal plane into a vertical plane from its fully retracted to its fully extended positions.

18. A traffic control device as defined in claim 16 or 17, in which the motor is a D.C. motor, a current polarity reversing relay coupling the motor to the power circuit of the vehicle, a switch for operating the relay, and circuit interrupters enabled by the beam reaching its fully extended and fully retracted positions for interrupting current supply to the motor.

19. A traffic control device as defined in claim 9 or 16 including a brake for retaining the beam in its fully extended or fully retracted position, and means for automatically releasing the brake upon the application of operating power to the motor.

20. A traffic control device as defined in claim 16 or 17, in which the vehicle is a school bus.

21. A traffic control device for mounting on or adjacent the roof of a vehicle, comprising a planar traffic control display, means supporting the display with its plane in a horizontal plane adjacent the vehicle, means for thrusting the display outwardly from the side of the vehicle along an axis orthogonal tot he axis of the vehicle, and means for rotationg the display through 90° to change the facing direction of the display from a horizontal plane into a different plane visible to traffic.

22. A traffic control device as defined in claim 21, in which the supporting means is comprised of a beam, said thrusting includes means for thrusting the beam outwardly from the vehicle substantially without rotation, and said rotating means includes means for independently rotating the traffic control display relative to the beam.

23. A traffic control device as defined in claim 22 in which said means for rotation the display is comprised of an electromechanical means.

24. A traffic control device as defined in claim 23 in which said electromechanical means for rotating said display rotates the display about a horizontal axis.

25. A traffic control device as defined in claim 23 or 24 in which the electromechanical means for rotating the display is comprised of a geared motor located at the end of the beam opposite the display, and a rod extending axially through the beam, the display being mounted on the rod, the motor being coupled to the end of the rod for rotating the display.

26. A traffic control device as defined in claim 23 or 24 in which the electromechanical means for rotating the display is comprised of a geared motor fastened to the end of the beam adjacent to and coupled to the display.

27. A traffic control device as defined in claim 22, in which said rotating means is comprised of a hinge coupling the display to the end of the beam, means for resiliently retaining the display with its plane in the same plane as the axis of the beam, a pusher arm, attached to the display adjacent the beam, and means for pushing the pusher arm so as to rotate the display about 90° about the axis of hinge as the beam is drawn toward of the vehicle.

28. A traffic control device as defined in claim 28 in which the means for pushing the pusher arm is a stop plate fixed relative to the vehicle.

29. A traffic control device as defined in claim 29 in which the pusher arm is an arm curved from the display to a line parallel to the axis of the beam.

* * * * *